March 10, 1970  E. E. GICK  3,500,191
MICROCIRCUIT TEST PROBE WITH GRAPPLER
Filed Dec. 7, 1967
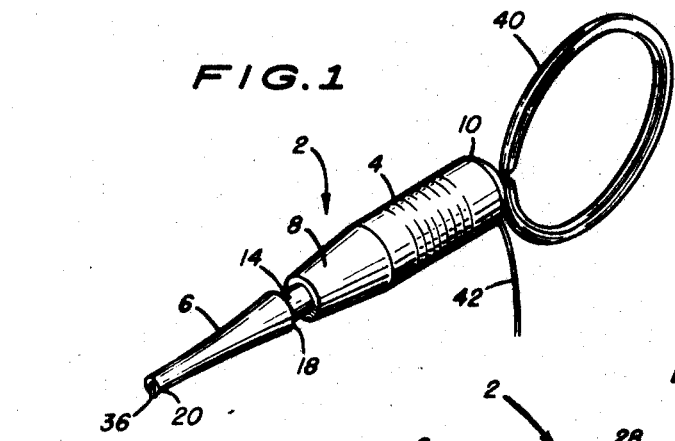
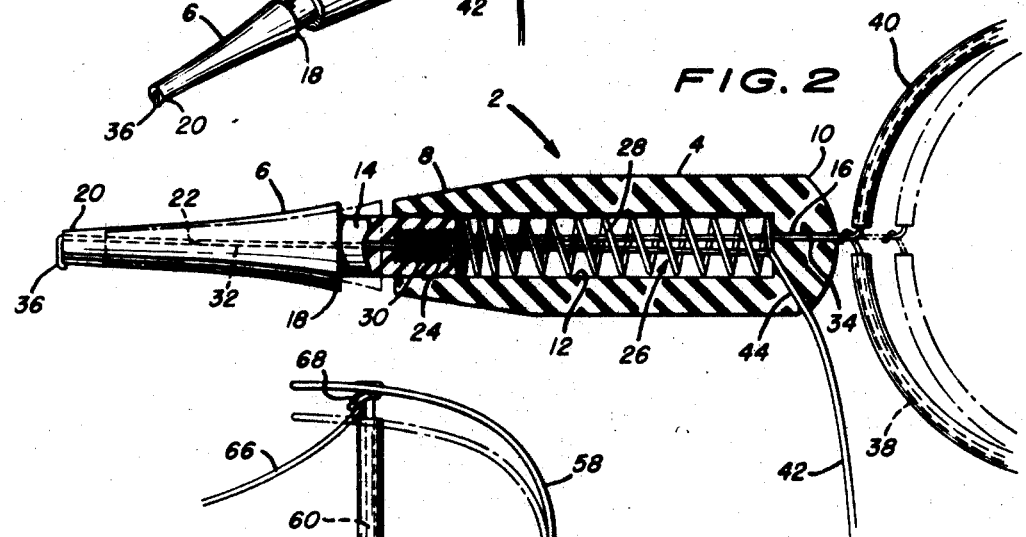
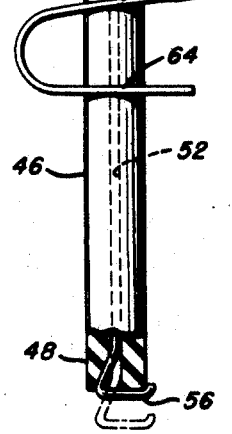
EUGENE E. GICK
INVENTOR
BY
ATTORNEY ![](United States Patent Office) 3,500,191
Patented Mar. 10, 1970

3,500,191
MICROCIRCUIT TEST PROBE WITH GRAPPLER
Eugene E. Gick, Rockville, Md., assignor, by mesne assignments, to the United States of America as represented by the Secretary of the Navy
Filed Dec. 7, 1967, Ser. No. 688,729
Int. Cl. G01r 31/02
U.S. Cl. 324—72.5                                 5 Claims

ABSTRACT OF THE DISCLOSURE

The present invention provides a simple device for testing microelectronic components without causing breakage or short circuits. The invention is a test probe by the use of which one may hook onto or into a circuit, particularly a microcircuit, without discontinuing the current flow within the circuit. A tapered plug which normally is spring biased into abutment with a hook portion of the contact end of the test probe is manually withdrawn to expose the hook portion for enabling engagement with the circuit.

BACKGROUND OF THE INVENTION

Field of the invention

The subject invention comprises a probe for testing a microelectronic circuit by establishing and maintaining an electrical connection which may be repeatedly broken and rejoined without discontinuing the current flow within the circuit.

Description of the prior art

The prior art includes a device for safely hooking onto or into an electrical circuit to test, connect or short-out said circuit without stopping the current flow within the circuit. An example of such a device is disclosed in Patent No. 2,969,519, issued to Gitchel A. Thomas on Jan. 24, 1961. In that patent there is shown a test probe comprising a plunger-operated wire hook adapted to grasp a circuit element. More specifically, the wire hook is attached to a spring-biased plunger which, when depressed by the user of the device, advances the hook and causes it to project from the end of a tapered plug. The hook may then be engaged with a circuit element. Upon release of the plunger the hook is retracted, thereby clamping the engaged circuit element against the end of the tapered plug. Said tapered plug is fitted with a small conductive contact plate in confronting relation to the hook. Said contact plate is joined to a straight electrically conductive wire which is embedded in the plug and which extends through an obliquely disposed opening in the sleeve of the device. Exterior to the device said wire is insulated and is capable of being attached to a measuring device. Electrical connection between the element to be tested and the measuring device is made through the contact plate and the adjoining conductive wire which leads to such measuring device. Said hook means acts only as a clamping device, having no electrical function.

SUMMARY OF THE INVENTION

The subject invention provides a means for testing microelectronic components, such as integrated circuit flatpacks, without causing breakage or short circuits. More particularly, the present device enables the establishment and maintenance of positive electrical contact which may be repeatedly broken and rejoined without restricting the current flowing within the circuit. The advent of microcircuitry has decreased the size of circuitry in electronic packages to the extent that existing test probes are hazardous to the circuitry because of possible breakage or shorting together of leads. The design and structure of the present device allows construction of an extremely small and lightweight probe which minimizes those dangers inherent in larger probes. Said device is so constructed so as to be light enough to be supported by the circuitry undergoing measurement.

It is therefore an object of the invention to provide a probe for testing circuitry by establishing and maintaining electrical connections which may be repeatedly broken and rejoined without shutting off the current flow within the circuit.

It is another object of the invention to provide an inexpensive easily fabricated test probe which will insure electrical connection with the component to be tested.

It is a further object of the invention to provide a small lightweight electrical test probe which will find use in microcircuitry.

Further objects and advantages of the invention will become more readily apparent from the following detailed description of the preferred embodiments thereof.

BRIEF DESCRIPTION OF THE DRAWINGS

FIG. 1 is a perspective view of one embodiment of the subject invention;

FIG. 2 is a longitudinal sectional view of the embodiment pictured in FIG. 1 showing extended and normal positions of the hook employed; and FIG. 3 is a side elevation, partly in section, showing a second embodiment of the invention.

DESCRIPTION OF THE PREFERRED EMBODIMENTS

Referring to the drawings and particularly to FIG. 2, a central body portion is shown generally at 2. Said central body portion is comprised of a cylindrical handle 4 and a tapered plug 6 both of which can be constructed of an electrically nonconductive material. Said cylindrical handle 4 has an inner end portion 8 and an outer end portion 10, said inner end portion tapering from the cylindrical midportion of said handle 4 to the inner end of said portion 8. Said handle 4 is formed with a cylindrical central body cavity 12, said body cavity extending from near the end of the outer end portion 10 and opening through the inner end portion 8 to slidably receive a reduced cylindrical rear end portion 14 of the tapered plug 6. The outer end portion 10 of the handle 4 is of a solid formation and has a bore 16 extending axially therethrough and communicating with said central body cavity 12. The cylindrical rear end portion 14 of the tapered plug 6 circumferentially flares at 18 and then tapers to a distal end portion 20. The tapered plug 6 is formed with a bore 22 extending from the distal end portion 20 to near the cylindrical rear end portion 14. An enlarged bore 24 extends midway through the cylindrical rear end portion 14 and communicates with the bore 22. An electrically conductive element 26 which is preferably formed of one continuous length of resilient wire has a coiled portion 28 which is slidably received within the central body cavity 12. The coiled portion 28 provides a coiled spring means which is constrained between the cylindrical end portion 14 of the tapered plug 6 and the closed outer end portion 10 of the handle 4. The coiled portion 28 narrows to coils of smaller radii 30 at the inner end portion 8 of said handle 4, said coils 30 being tightly secured in the enlarged bore 24 of the tapered plug 6. The electrically conductive element 26 has first and second end portions 32 and 34 which double back through the interior of coiled midportion 28, said first end portion 32 extending through the smaller bore 22 of tapered plug 6 where it is bent and extended laterally to form a hook 36 which normally engages against the distal end portion 20 of tapered plug 6. Said second end portion 34 of electrically conductive element 26 is received through bore 16 of the outer end portion 10 of handle 4 and protrudes externally of said handle 4 to form a finger loop 38. Said loop 38 is covered with a nonconductive material 40 to prevent shorting of the circuit which is being probed should said test probe accidentally contact said circuit. A lead 42 is attached to the conductive element 26 and extends through a second bore 44 in the outer end portion 10 of handle 4.

In operation, when loop 38 is pulled by the user, tapered plug 6 will retract, thereby compressing the coiled portion 28 and exposing the hook end 36. Said hook end 36 may then be engaged with a circuit element. On release of the loop, said tapered plug 6 will be spring biased by the coiled wire portion to positively clamp the circuit element between the hook end and the end of the tapered plug member.

The embodiment shown in FIG. 3 comprises a cylindrical central body portion 46 having an inner end portion 48 and an outer end portion 50, said central body portion 46 being fitted with a bore 52 extending the length thereof. An electrically conductive element 54 is slidably received within said bore 52, being formed into a hook 56 at inner end portion 48 and extending externally of the outer end portion 50 of said body portion 46. A curved resilient member 58 of generally reverse-S shape, is attached to an extended portion 60 of said conductive member 54 and twice joined to the central body portion 46, at points 62 and 64 of said curved resilient member 58. A lead 66 is joined to said conductive member 54 through a small conductive loop 68 attached at the extremity of extended portion 60 of conductive member 54. Said loop 68 is not essential to the invention but is advantageous in preventing wearing of the lead 66 by relieving local stress.

Pressure exerted on the curved resilient member 58 biases the hook 56 away from the end of central body portion 46, allowing said hook to grasp an electrical component in proximity thereto. On release of said pressure, said resilient member 58 biases the hook 56 toward the inner end portion 48 of said central body portion. In some instances, either modification of the device may be used merely as a prod. In such cases, the hook 56 is merely applied to a test point of an electrical component or circuit to be tested, without hooking it to said component or circuit. Due to the possibility of forming the body portions of the present invention from such materials as plastic or nylon, the probe is lightweight enough to be left attached to microelectronic components without any support other than that provided by the component itself.

What is claimed is:
1. A microcircuit test probe and connector device comprising
   a central body portion having an inner end portion and an outer end portion, said central body portion constituting an elongated handle member and having a central body cavity, said cavity being open at the inner end portion of said central body portion and closed at the outer end portion of said central body portion;
   the outer end portion of the central body portion having a bore communicating with said central body cavity;
   tapered plug means disposed exteriorly of the inner end portion of the central body portion and having a distal end portion and a cylindrical end portion, said cylindrical end portion being insertable into the central body cavity and being slidable within said cavity;
   the tapered plug means having a bore extending axially throughout its length;
   an electrically conductive element having a first end portion, a second end portion and a coiled spring intermediate portion, said intermediate portion being substantially disposed within the central body cavity, said first end portion of said conductive element extending through said bore in the tapered plug means and forming a circuit engaging means exteriorly of said plug means;
   said second end portion of said conductive element being slidably extended through said first-mentioned bore externally of said central body portion and forming exteriorly of said central body portion grasping means for engagement by a user whereby external pressure may be applied to the electrically conductive element;
   said coiled spring intermediate portion of said conductive element being constrained between the cylindrical end portion of the tapered plug means and the outer end portion of the central body cavity;
   said coil spring interior portion being attached to the cylindrical end portion of said tapered plug means;
   operation of the probe being effected by the application of external pressure to the grasping means for sliding the tapered plug means toward the central body portion for exposing the circuit engaging means for engagement with an electrical component to be tested, the coiled spring intermediate portion of said conductive element being thereby compressed and upon release of external pressure serving to return the tapered plug means to a position clamping said component between said circuit engaging means and the distal end of said plug means, and
   an electrically conductive lead secured to said conductive element.

2. The microcircuit test probe and connector device of claim 1, wherein said circuit engaging means normally engages the distal end portion of the tapered plug means.

3. The microcircuit test probe and connector device of claim 1 wherein said outer end portion of the central body portion is formed with a second bore, said second bore receiving said electrically conductive lead therethrough.

4. The microcircuit test probe and connector device of claim 1 wherein said circuit engaging means formed from the first end portion of the electrically conductive element comprises a hook.

5. The microcircuit test probe and connector device of claim 1 wherein said grasping means formed from the second end portion of the electrically conductive element comprises a loop.

References Cited

UNITED STATES PATENTS

| 1,650,779 | 11/1927 | Williams. |
| 2,969,519 | 1/1961 | Thomas _____ 324—72.5 XR |
| 3,201,746 | 8/1965 | Askew _____ 339—108 |

OTHER REFERENCES

Wireless World, July 1947, p. 240.

RUDOLPH V. ROLINEC, Primary Examiner

E. L. STOLARUN, Assistant Examiner